US 11,171,905 B1
Nov. 9, 2021

(12) United States Patent
Ledet

(10) Patent No.: US 11,171,905 B1
(45) Date of Patent: Nov. 9, 2021

(54) REQUEST AND DELIVERY OF ADDITIONAL DATA

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 15/895,446

(22) Filed: Feb. 13, 2018

Related U.S. Application Data

(63) Continuation of application No. 15/785,262, filed on Oct. 16, 2017.

(60) Provisional application No. 62/409,019, filed on Oct. 17, 2016.

(51) Int. Cl.
*H04L 12/58* (2006.01)
*G06F 16/951* (2019.01)
*G06F 3/0481* (2013.01)

(52) U.S. Cl.
CPC ............ *H04L 51/22* (2013.01); *G06F 16/951* (2019.01); *H04L 51/08* (2013.01); *G06F 3/0481* (2013.01)

(58) Field of Classification Search
CPC ....... H04L 51/22; H04L 51/08; G06F 16/951; G06F 3/0481
USPC .......................................................... 709/206
See application file for complete search history.

(56) References Cited

U.S. PATENT DOCUMENTS

| | | |
|---|---|---|
| 5,859,898 A | 1/1999 | Checco |
| 5,873,107 A | 2/1999 | Borovoy et al. |
| 5,920,562 A | 7/1999 | Christie et al. |
| 6,389,114 B1 | 5/2002 | Dowens et al. |
| 6,438,748 B1 | 8/2002 | Gard et al. |
| 6,990,514 B1 | 1/2006 | Dodrill et al. |
| 7,319,700 B1 | 1/2008 | Kompella |
| 7,349,700 B1 | 3/2008 | Goldfinger |
| 7,903,639 B2 | 3/2011 | Foo et al. |
| 8,200,258 B2 | 6/2012 | Yahav et al. |
| 8,286,085 B1 * | 10/2012 | Denise ................. G06Q 10/107 715/752 |
| 8,391,136 B1 | 3/2013 | Eidelson et al. |
| 8,577,422 B1 | 11/2013 | Ledet |
| 8,781,079 B2 | 7/2014 | Hao et al. |
| 8,892,080 B2 | 11/2014 | Bolouri |
| 9,219,704 B2 | 12/2015 | Hamlin et al. |
| 9,241,063 B2 | 1/2016 | Shih et al. |
| 9,336,674 B1 * | 5/2016 | Thirumalaisamy .... G08B 25/10 |
| 9,338,597 B2 | 5/2016 | Abu-Hakima et al. |

(Continued)

OTHER PUBLICATIONS

Anonymous,Superuser, "Message with Drop-Down/Component", Jan. 2016, Internet—Superuser, https://superuser.com/questions/1027985/ message-with-drop-down-combobox, p. 1-5 (Year: 2016).

(Continued)

*Primary Examiner* — Joshua Joo

(57) ABSTRACT

An example operation may include one or more of monitoring communication between at least one originator device and one recipient device; transmitting a request to the at least one originator device querying if additional data related to the monitored communication is desired; receiving a positive response to the query from the at least one originator device; determining related data pertaining to the monitored communication; and transmitting the related data to the originator user device.

18 Claims, 9 Drawing Sheets

(56) References Cited

U.S. PATENT DOCUMENTS

| | | | |
|---|---|---|---|
| 9,584,493 B1* | 2/2017 | Leavy | G06F 16/22 |
| 9,819,621 B2 | 11/2017 | Ghafourifar et al. | |
| 9,998,885 B2 | 6/2018 | Shelkovin et al. | |
| 10,015,120 B2 | 7/2018 | Misra et al. | |
| 10,038,735 B2 | 7/2018 | Majeti et al. | |
| 10,063,710 B2 | 8/2018 | Feuer | |
| 10,075,828 B2 | 9/2018 | Horton et al. | |
| 10,122,665 B2 | 11/2018 | Beausoleil et al. | |
| 10,129,211 B2 | 11/2018 | Heath | |
| 10,216,709 B2 | 2/2019 | Lane et al. | |
| 10,332,085 B2 | 6/2019 | Attolini et al. | |
| 10,588,016 B2 | 3/2020 | Chen et al. | |
| 2002/0016818 A1 | 2/2002 | Kirani et al. | |
| 2002/0059073 A1 | 5/2002 | Zondervan et al. | |
| 2003/0184587 A1 | 10/2003 | Ording et al. | |
| 2006/0055528 A1 | 3/2006 | Akamatsu | |
| 2006/0086799 A1* | 4/2006 | Robertson | G06Q 10/107 235/462.1 |
| 2006/0168049 A1* | 7/2006 | Orozco | H04L 51/04 709/206 |
| 2007/0043866 A1* | 2/2007 | Garbow | G06Q 10/107 709/226 |
| 2007/0100942 A1 | 5/2007 | Lin et al. | |
| 2007/0124376 A1 | 5/2007 | Greenwell | |
| 2007/0180035 A1* | 8/2007 | Liu | G06Q 10/107 709/206 |
| 2008/0028323 A1 | 1/2008 | Rosen et al. | |
| 2008/0065728 A1* | 3/2008 | Haas | G06Q 30/02 709/206 |
| 2008/0160960 A1 | 7/2008 | ElRif et al. | |
| 2008/0270547 A1 | 10/2008 | Glickstien et al. | |
| 2009/0019119 A1 | 1/2009 | Scheffler | |
| 2009/0049139 A1* | 2/2009 | Fouotsop | G06Q 10/107 709/206 |
| 2009/0106365 A1* | 4/2009 | Drory | G06Q 10/107 709/206 |
| 2009/0172077 A1 | 7/2009 | Roxburgh et al. | |
| 2009/0249226 A1 | 10/2009 | Manolescu et al. | |
| 2009/0307370 A1* | 12/2009 | Boerries | G06Q 10/107 709/232 |
| 2010/0069103 A1* | 3/2010 | Karmarkar | H04M 1/7243 455/466 |
| 2010/0287183 A1* | 11/2010 | Kamireddy | G06F 16/951 707/769 |
| 2011/0071832 A1 | 3/2011 | Handa et al. | |
| 2012/0148034 A1 | 6/2012 | Ferguson | |
| 2012/0149404 A1 | 6/2012 | Beattie et al. | |
| 2012/0209871 A1* | 8/2012 | Lai | G06F 16/907 707/769 |
| 2012/0226707 A1* | 9/2012 | Brun | G06F 40/279 707/769 |
| 2012/0303452 A1* | 11/2012 | Xue | H04L 51/02 705/14.49 |
| 2013/0080541 A1 | 3/2013 | Herbert | |
| 2013/0080545 A1 | 3/2013 | Datta | |
| 2013/0097270 A1* | 4/2013 | Plotkin | H04M 1/72547 709/206 |
| 2013/0138746 A1* | 5/2013 | Tardelli | H04L 67/1095 709/206 |
| 2013/0159830 A1 | 6/2013 | Lee et al. | |
| 2014/0201264 A1 | 7/2014 | Soon-Shiong | |
| 2014/0201293 A1 | 7/2014 | Turakhia | |
| 2015/0089417 A1 | 3/2015 | Dayan | |
| 2015/0248389 A1* | 9/2015 | Kahn | H04L 51/18 715/230 |
| 2015/0310072 A1 | 10/2015 | Dietz et al. | |
| 2015/0381423 A1 | 12/2015 | Xiang | |
| 2016/0099896 A1 | 4/2016 | Huang | |
| 2016/0099903 A1 | 4/2016 | Dabney et al. | |
| 2016/0127333 A1 | 5/2016 | Sood et al. | |
| 2016/0149839 A1 | 5/2016 | Yi et al. | |
| 2016/0150433 A1* | 5/2016 | Bergquist | H04W 74/06 370/328 |
| 2016/0173424 A1 | 6/2016 | Fuhrmann | |
| 2016/0212208 A1 | 7/2016 | Kulkarni et al. | |
| 2017/0078232 A1* | 3/2017 | Faruk | H04L 67/02 |
| 2017/0093776 A1 | 3/2017 | Dixon | |
| 2017/0104608 A1 | 4/2017 | Sergeev et al. | |
| 2017/0118189 A1 | 4/2017 | Venkatakrishnan et al. | |
| 2017/0134456 A1 | 5/2017 | McDonnell et al. | |
| 2017/0187654 A1 | 6/2017 | Lee | |
| 2017/0222959 A1* | 8/2017 | Devasthali | H04L 51/02 |
| 2017/0249180 A1 | 8/2017 | Chen et al. | |
| 2017/0286755 A1 | 10/2017 | Kaletsky | |
| 2017/0331769 A1 | 11/2017 | Curry et al. | |
| 2017/0345079 A1* | 11/2017 | Rangan | G06Q 30/0633 |
| 2017/0364866 A1 | 12/2017 | Steplyk et al. | |
| 2018/0006979 A1* | 1/2018 | Barsness | G06F 40/253 |
| 2018/0048595 A1 | 2/2018 | Dotan-Cohen et al. | |
| 2018/0048606 A1 | 2/2018 | Goslar | |
| 2018/0241630 A1 | 8/2018 | Andrianov et al. | |
| 2019/0014112 A1 | 1/2019 | Lacey et al. | |
| 2019/0034451 A1 | 1/2019 | Nayak et al. | |
| 2019/0044838 A1 | 2/2019 | Yao et al. | |
| 2019/0253264 A1 | 8/2019 | Singaravelu et al. | |
| 2019/0258796 A1 | 8/2019 | Paczkowski et al. | |
| 2019/0260690 A1 | 8/2019 | Sun et al. | |
| 2019/0266012 A1 | 8/2019 | Chou | |
| 2019/0287146 A1 | 9/2019 | Maitland et al. | |
| 2019/0288914 A1 | 9/2019 | Celozzi et al. | |
| 2019/0334781 A1 | 10/2019 | Caldwell et al. | |
| 2019/0349272 A1 | 11/2019 | Chou | |
| 2019/0379728 A1 | 12/2019 | Hellstrom et al. | |
| 2020/0028787 A1 | 1/2020 | Mehra et al. | |
| 2020/0044919 A1 | 2/2020 | Yao et al. | |
| 2020/0084131 A1 | 3/2020 | Bisht et al. | |
| 2020/0104154 A1 | 4/2020 | Chou | |

OTHER PUBLICATIONS

T. Ahmad, G. Sukanto, H. Studiawan, W. Wibisono and R. M. Ijtihadie, "Emoticon-based steganography for securing sensitive data," 2014 6th International Conference on Information Technology and Electrical Engineering (ICITEE), Yogyakarta, 2014, pp. 1-6. (Year: 2014).

V. Iranmanesh, H. Jing Wei, S. Lee Dao-Ming and 0. A. Arigbabu, "On using emoticons and lingoes for hiding data in SMS," 2015 International Symposium on Technology Management and Emerging Technologies (ISTM ET), Langkawai Island, 2015, pp. 103-107 . (Year: 2015).

Thi-Hui Wang, The Due Kieu, Chin-Chen Chang and Ming-Chu Li, "Emoticon-based text steganography in chat," 2009 Asia-Pacific Conference on Computational Intelligence and Industrial Applications (PACIIA), Wuhan, 2009, pp. 457-460. (Year: 2009).

Joshi B. (2013) Event Handling. In: Beginning jQuery 2 for ASP.NET Developers. Apress, Berkeley, CA, Beginning jQuery 2 for ASP.NET Developers pp. 103-133; Jan. 4, 2014 (Year: 2014).

StackOverflow, "focus and focusout event order switching from one field to another", stackOverflow, "https://stackoverflow.com/ questions/ 41553992/focus-and-focusout-event-order-switching-from-one-field-to-another", Internet, Jan. 2017 (Year: 2017).

StackOverflow,"Is it guaranteed that blur( ) event happens before the focus( ) when giving focus to a new element", stackOverfloow, https ://stackoverflow .com/q uestions/20340091 /is-it-guaranteed-that-blur -event-happens-before-the-focus-when-giving-focus, Interview, Dec. 2013 (Year: 2013).

Anonymous, "Should I use POP3 or IMAP?" MSOutlook.info. Jul. 3, 2014. Accessed Apr. 14, 2021: https://www.msoutlook.info/question/815>. (Year: 2014).

* cited by examiner

REQUEST AND DELIVERY OF ADDITIONAL DATA

CROSS REFERENCE TO RELATED APPLICATION

This application is a continuation of U.S. application Ser. No. 15/785,262, filed Oct. 16, 2017, entitled DATA INTERACTION WITH MESSAGES, which claims the benefit of U.S. Provisional Application No. 62/409,019, filed Oct. 17, 2016, entitled MESSAGING, the disclosures of which are incorporated in their entirety herein by reference.

FIELD

The current application generally pertains to delivering data to a client and more particularly pertains to request and delivery of additional data.

BACKGROUND

In today's workplace, efficient communication with many different individuals or groups of people has become increasingly important and essential.

Various types of systems and methods exist today, which can be used to search a body of text files for the presence of one or more search terms (key words). However, such currently-available systems and methods do not provide an efficient and effective means for assisting users in locating and identifying relevant additional data pertaining to a conversation between two or more users, utilizing key words and relevant phrases, identified by the system.

SUMMARY

Embodiments of the present application provide systems, methods and computer program products of efficiently and reliably providing additional requested data to clients.

When communicating with recipient(s) of messages, the system may query a client to determine if additional data is desired. Upon acknowledgement that additional data is requested, the system attempts to locate related data, for example files, etc., related to the ongoing conversation and present said data to the client device.

In some embodiments, a timer is started upon reception of a message and when the timer pops, the client is asked if additional data is desired.

The additional data may be interworked into the messaging application or received in a separate application, more specific to the current application.

In an additional embodiment, the current application creates supporting data to make the case of what is being sent in a message, and allows the data to be attached to an outgoing message.

The present application enables the identification of relevant files/documents/calendar data/attachments and or links pertaining to a particular conversation between two or more users. Furthermore, as the following will demonstrate, the present application provides a novel and extremely beneficial way to identify relevant additional documents (and sets of files), by being able to identify relevant keywords and phrases, which can be displayed on the user device, as described and illustrated below.

One example embodiment may include a method comprising one or more of monitoring communication between at least one originator device and one recipient device; transmitting a request to the at least one originator device querying if additional data related to the monitored communication is desired; receiving a positive response to the query from the at least one originator device; determining related data pertaining to the monitored communication; and transmitting the related data to the originator user device.

Another example embodiment may include a system comprising at-least one processor, and a software agent operated by the processor and configured to perform one or more of a software agent operated by the processor and configured to: monitor communication between at least one originator device and one recipient device; transmit a request to the at least one originator device to query if additional data related to the monitored communication is desired; receive a positive response to the query from the at least one originator device; determine related data that pertains to the monitored communication; and transmit the related data to the originator device.

Another example embodiment may include a non-transitory computer readable medium is encoded with computer program instructions that when executed by one or more computers cause the one or more computers to perform one or more of monitoring communication between at least one originator and one recipient device; transmitting a request to the at least one originator device querying if additional data related to the monitored communication is desired; receiving a positive response to the query from the at least one originator device; determining related data pertaining to the monitored communication; and transmitting the related data to the requesting originator user device.

Another example embodiment may include a method comprising one or more of entering of text on the at least one originating user device in the composition of a message between the at least one originating device and at least one recipient device, obtaining an understanding of the entered text, searching for related data pertaining to the entered text, and transmitting the related data to the at least one originating device.

Another example embodiment may include a system comprising at-least one processor, and a software agent operated by the processor and configured to perform one or more of enter text on the at least one originating device in the composition of a message between the at least one originating device and at least one recipient device; understand the entered text, search for related data that pertains to the entered text, and transmit the related data to the at least one originating device.

Another example embodiment may include a non-transitory computer readable medium is encoded with computer program instructions that when executed by one or more computers cause the one or more computers to perform one or more of entering of text on the at least one originating user device in the composition of a message between the at least one originating device and at least one recipient device, obtaining an understanding of the entered text, searching for related data pertaining to the entered text, and transmitting the related data to the at least one originating device.

Reference in the specification to one embodiment or an embodiment means that a particular feature, structure or characteristic described in connection with the embodiment is included in at least one embodiment of the application. The appearance of the phrase "in one embodiment" in various places in the specification do not necessarily refer to the same embodiment.

Additional aspects of the application be set forth in part in the description which follows, and in part will be obvious from the description, or may be learned by practice of the application. The aspects of the application will be realized and attained by means of the elements and combinations particularly pointed out in the appended claims. It is to be understood that both the foregoing general description and the following detailed description are exemplary and explanatory only and are not restrictive of the application, as claimed.

The present application will now be described with reference to the following drawings, in which like reference numbers denote the same element throughout.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

In the drawings.

DETAILED DESCRIPTION

Embodiments of the present application are described herein in the context of a system of computers, servers, and software. Those of ordinary skill in the art will realize that the following detailed description of the present application is illustrative only and is not intended to be in any way limiting. Other embodiments of the present application will readily suggest themselves to such skilled persons having the benefit of this disclosure. Reference will now be made in detail to implementations of the present application as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure. In addition, anywhere the word user appears, it means the user client device(s), the user device(s), and/or any device containing a memory and processor interacted with in some fashion by the user.

Anywhere the word user appears, it means the user client device(s), the user device(s), and/or any device containing a memory and processor interacted with in some fashion by the user.

Figure 1:
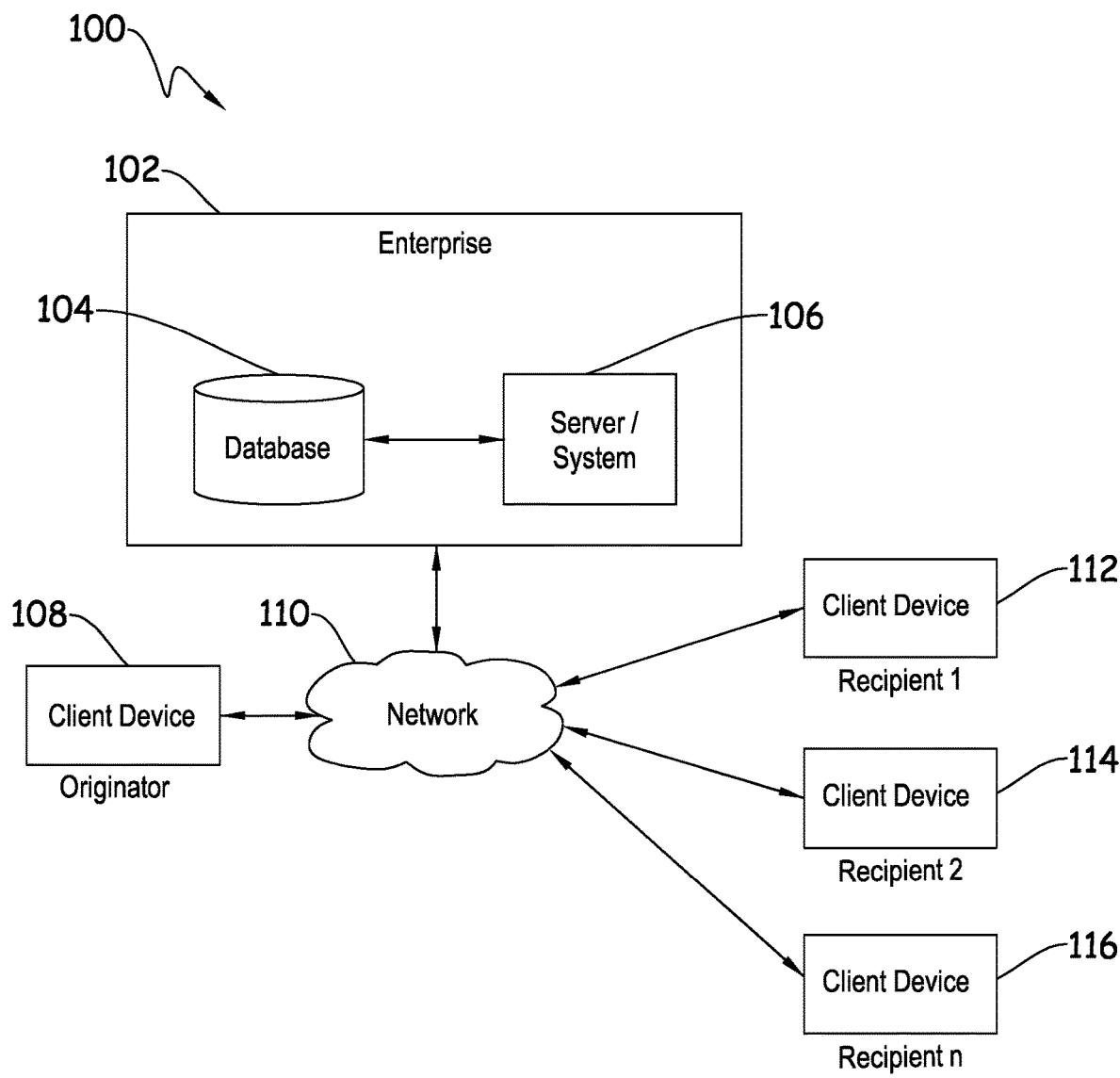
FIG. 1 is a block diagram of a system environment in accordance with an embodiment of the present application.

Referring now to the figures, FIG. 1 displays the system diagram of the present application 100. The present application allows a user utilizing a client device 108 to access the current application (in the form of software, for example) to be downloaded from the Network 110 or that currently resides on the client's device. The client device 108 can be any of a mobile laptop device and/or a personal desktop computer or a mobile device. The client device 108 is connected to the Network 110. It should be noted that other types of devices, in addition to devices 108, might be used with the present application. For example, a PDA, an MP3 player, or any other wireless device, a gaming device (such as a hand held system or home based system), any computer wearable device, and the like (including a P.C. or other wired device) that may transmit and receive information may be used with the present application.

One or more client devices 112,114,116 may exist and interact with the Network 110. The client device 112,114,116 can be any of a mobile laptop device and/or a personal desktop computer or a mobile device, and may be the recipient(s) of a message. The client device 112,114,116 is connected to the Network 110. It should be noted that other types of devices, in addition to devices 112,114,116, might be used with the present application. For example, a PDA, a tablet computer, a laptop, an MP3 player, a gaming device (such as a hand held system or home based system) and the like (including a P.C. or other wired device) that can also transmit and receive information could be used with the present application.

There exists an environment 102 which may be a network that is organized in relation to an organization and connected to the network 110. This environment may be an enterprise environment, or a non-enterprise environment and furthermore, may be a network that has many servers and databases. For discussion of the current application, a single system 106 and database 104 is depicted, but one versed in network technology will ascertain that the elements presented in the enterprise environment may be numerous without deviating from the scope of the current application.

In an alternate embodiment, the system 106 of the current application 106 may reside inside the enterprise 102, or outside the enterprise in one or more of either the existing elements depicted therein or any other element containing a processor and memory.

The application of the current application preferably resides on the client device 108,112,114,116 which can be a mobile device, but can also reside on a user's desktop computer, a personal digital assistant (PDA), tablet computer, or any other device containing a processor, memory, and an operating system. If the application resides on a mobile device, the application is downloaded through a platform (such as an application store or market) residing on the device or accessed via the device.

The current application can work with any device such as a personal computer with a touch screen, a laptop with a touch screen, a personal computing tablet, a smartphone or any device with a processor, memory and a touch screen.

The enterprise 102 may be any type of environment, for example Customer Relationship Management (CRM) or Enterprise Resource Planning (ERP), or any other type of network usually associated with an organization.

Any element described or depicted herein can constitute more than one like element. For example, server 106 can constitute multiple servers. Also, the system may exist entirely or in part in any of the elements in the system diagram, for example the client device 108, 112, 114, 116.

The current application generally involves requesting a client if additional data is desired, and presenting the client with said data if the additional data can be determined, the additional data being related to the current conversation/interaction and the current data being obtained via one or more of the recipient(s) of the current conversation.

In one embodiment, a timer is started upon the system 106 sending a message to the client device of a user for a static or user-defined time period. When said timer pops, the system sends a message to the client device of the user to determine if additional data is desired.

A response is received indicating the preference of the user to obtain additional data. If additional data is requested, the system seeks related data wherein the data is related to the key words/key phrases/key sentences previously sent messages of the conversation.

This data is returned to the client device of the user.

Figure 2:
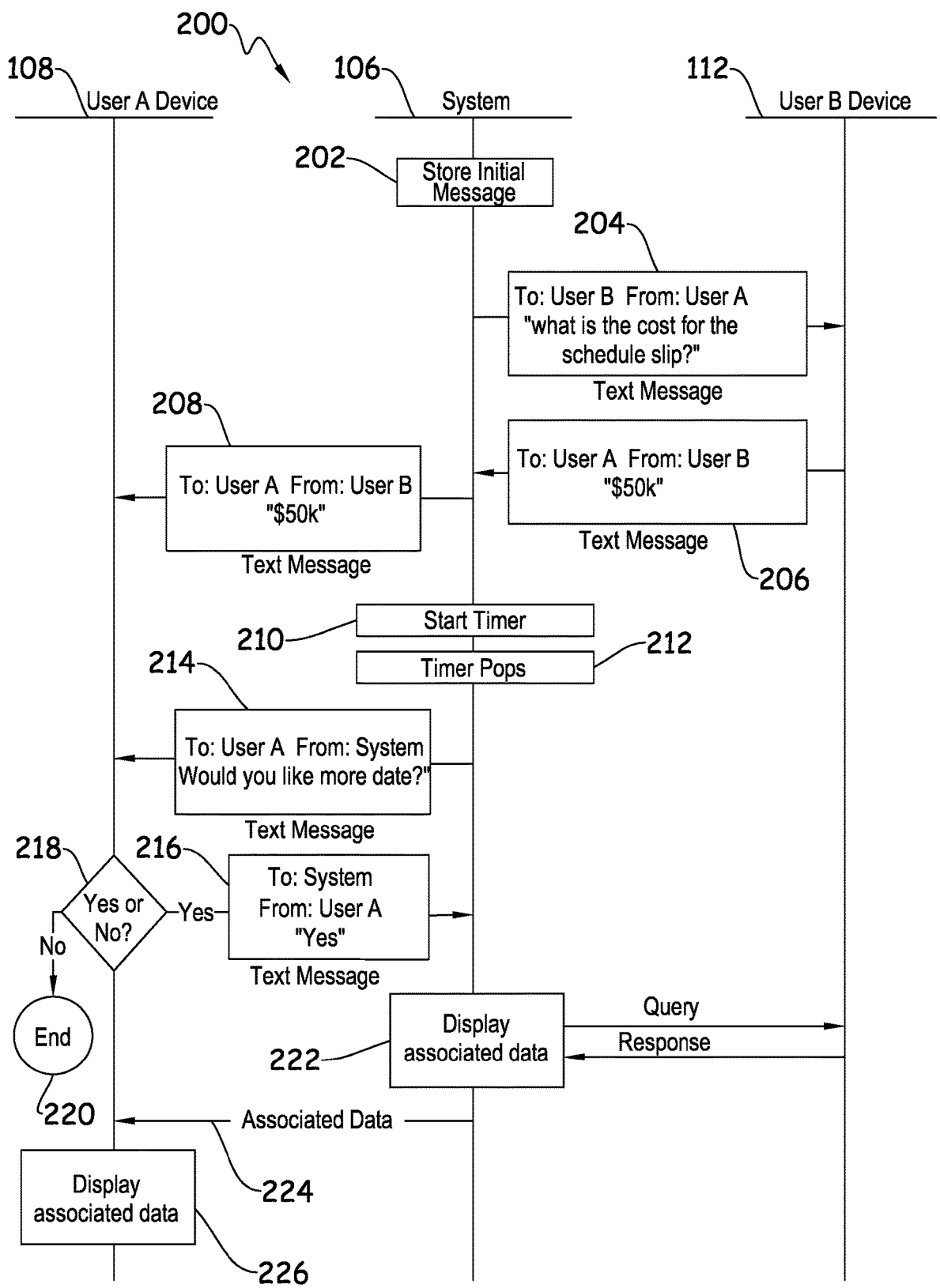
FIG. 2 is a flow chart depicting a system initiated request for more data in accordance with an embodiment of the present application.

FIG. 2 is a flowchart that depicts the scenario where the system 106 initiates a request for more data in one implementation of the current application 200.

The reception of the original message 202 is stored in the system 106 or a database 102 such that the data in the messages may be queried by the current application via query messages, such as Structured Query Language (SQL).

In an alternate embodiment, all messages are routed through the system 106, wherein the data in the messages are stored therein or in a database such as 102.

A message 206 is sent to the client device of User A 108 from the client device of User B 112, potentially in response to message 204. This response may be the same protocol as the received message 204 protocol. In this example, the response is "$50 k", similarly in response to a question presented in the received message 204. The message 206 is routed to the System 106 wherein the system may be a separate entity or part of the client 112.

The system 106 forwards the message 206 to the recipient (User A's client device 108) and a timer is started 210. The timer is for a set, specific time, which is predetermined, for example 60 minutes. This timer allows the system 106 to take action in the scenario wherein the recipient (client device User A 108) does not respond to the sent message 208. If the client device of the recipient sends a message to the originator (client device User B), the timer is cancelled. The system may initiate a further message to the recipient if the timer expires wherein the recipient is queried to see if further information is desired.

The timer pops 212 in the system 106, which corresponds to the failure of the recipient (client device of User A 108) to send a message to the originator (client device User B 112).

The system initiates a message 214 to the client device User A, with the message: "Would you like more data?" This message is sent to inform the client device that more information may be available and further inform the user of additional data that may assist in understanding the issue at hand.

The client device User A then may respond to the message positively or negatively. In one embodiment, the GUI of the client device shows two buttons on the display: "Yes" and "No". If the user chooses the "Yes" button, then a message is sent 216 to the system indicating more information is desired.

In another embodiment, the client device receives the message and a return message is responded with a "Yes" or "No" 218. This message is received by the system and processing either continues (in the scenario wherein a "Yes" or similar word is received), or halts (in the scenario wherein a "No" or similar word is received.

In another embodiment, if there is no response to the message within a predetermined time, it is assumed that further information is not desired and the process ends 210.

The message is received indicating a positive answer to the system query 214, and processing occurs to determine related data 222, further disclosed below. The client device of the user 112 may be queried via a query message and response message to obtain related data.

The data encountered in step 222 is sent to the client device of User A 108 via an "Associated Data" message 224.

The data is displayed on the client device of User A 226 of which further GUI details are depicted below.

Determining Additional Data

Figure 3:
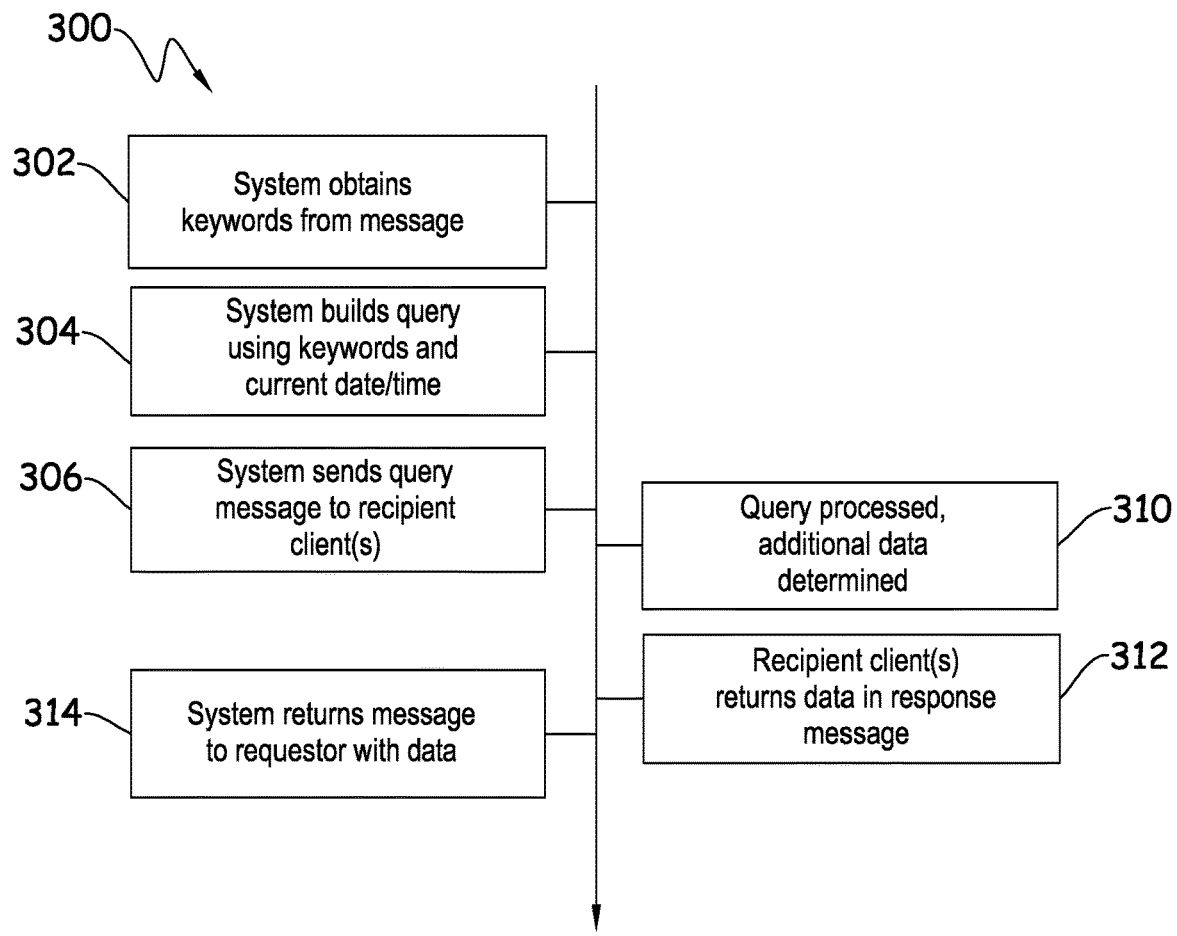
FIG. 3 is a flow chart depicting an implementation of an embodiment of the present application.

FIG. 3 shows a flowchart depicting the processing of the system 106 determining associated data given the input of a query message in one implementation of the current application 300.

The system parses the incoming message, determining keywords/phrases 302.

In one embodiment, the main parts of the body of the message are analyzed 202. This process utilizes Natural Language Processing (NLP), and analysis tools such as a text content and keyword analyzer wherein the main sentences and keywords are extracted from text. For example, the Hatmandu application analyzes text and pulls the most important words, as well as the most important sentences, in terms of the text's themes.

In another embodiment, the tool Natural Language Toolkit (NLTK) is utilized to perform analysis on an original message 202. NLTK provides a pool of language processing tools written in the Python language, including data mining, machine learning, data scraping, sentiment analysis and other various language processing tasks.

Figure 4:
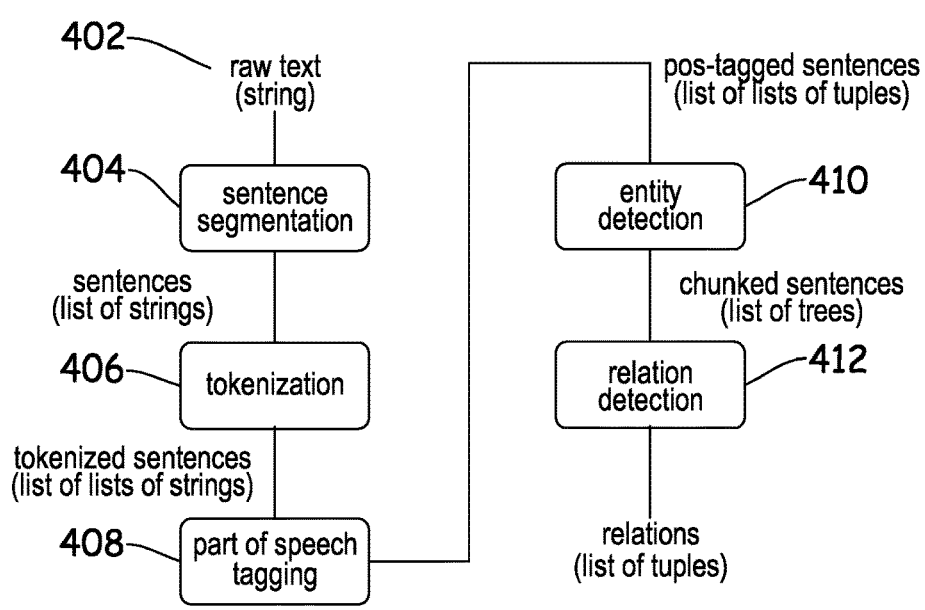
FIG. 4 is a flow chart illustrating the processing of the NLTK tool.

FIG. 4 is a flow of processing for the NLTK tool. Raw text 402 is used as input, for example the original message 400. The raw text is first split into sentences, a process called sentence segmentation 404. The next process is tokenization 406 where all words in the sentences are split into words where each word is a separate string. This is the most basic natural language processing technique. The parts of speech 408 are then determined, followed by entity detection 410 where a search for mentions of potentially interesting entities in each sentence is performed. Finally, relation detection 412 is performed where the elements are searched for likely relations between different entities in the text.

The message is examined via parsing logic commonly used to parse text. For example, the text in the message may be broken up into individual parts, or tokens, and keywords are determined in the message. These keywords are important parts of the message and/or parts of the message that contain the subject matter of the message, or key words/phrases of the message. Each part of the message may be parsed including the subject, the body, and the attachment(s).

The system uses the keyword/key phrase from step 302 to build an outgoing message, for example a query message, sent to the client device of the recipient(s). In another embodiment, the data of the reception of the incoming message is also added to the data of the outgoing message 304.

The built message is sent to the client device(s) of the recipient(s) 306.

The client device(s) of the recipient(s) process the incoming message and determine associated data related to the incoming message 310. The data of the incoming message is used to determine the associated data, such as the originator of the initial message, the keyword(s)/key phrase(s), the timestamp, etc.

The associated data is sent to the system 106 containing the associated data 312. This data may be one or more of a calendar event, a document file, a link to a document file, image, video or any other multimedia file, etc.

The system sends the data to the client device of the originator 314.

Figure 5:
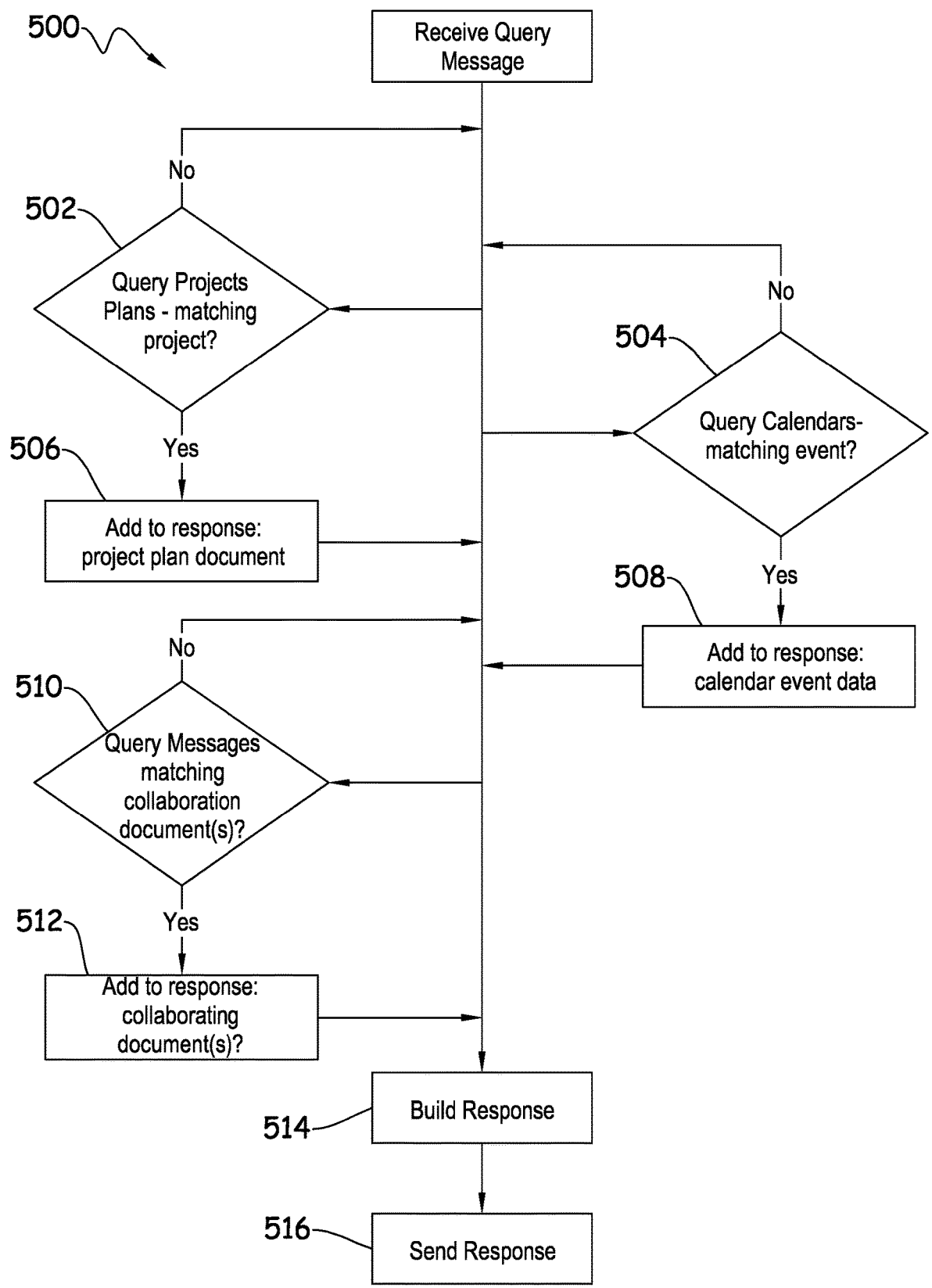
FIG. 5 illustrates flow chart showing the processing on an incoming query message in one embodiment of the current application.

FIG. 5 shows the processing of an incoming query message 500 in the client device 112. FIG. 5 provides further details of "the query processed, additional data determined" 310 in FIG. 300. The query message is received and processed. The query message contains the details of the originator of the message and the recipient(s) of the outgoing message. These details may be data stored in the client device such as the users name, email, user identification, project details, collaborative assignments such as project(s) wherein both the originator and recipient(s) are both assigned to the same project, etc.

Of note is the functional flow of the processing of the query message. The processing of the message is depicted such that the querying of project plans 502 is processed first, followed by the querying of the calendar(s) 504, and finally the query matching collaboration document(s) 510. It should be considered that the processing of the specific areas might be processed in any order as indicated by the "bus" wherein each of the processes are originated.

In another embodiment, other functionalities may be designed wherein the originator and recipient(s) data are compared without deviating from the scope of the current application. For example, the originator's data and the recipient(s) data may be used to query other applications either within the enterprise environment and/or outside of the enterprise environment. For example, software development applications such as code repositories, document repositories, etc. As another example, message applications such as email applications, may be queried to determine previously exchanged messages between the two parties.

A project plan application or database is queried 502 using the originator's data and the recipient(s)' data. Client device 112 obtains access to users of the system, as well as specific projects inside the organization, for example the enterprise environment. This access may be internal to the organization, such as an intranet, or via access to an external server and/or database wherein communication occurs through a network 110. This occurs via interaction with an organization's project planning software via access Application Programming Interfaces (APIs), for example.

In one embodiment, the project planning data (such as in a database) may be queried using a database query language, such as Structured Query Language (SQL). For example, projects may be queried wherein the originator's data and the recipient(s)' data is searched to determine if any of the projects contain both the originator and recipient(s).

If there are one or more projects containing both the originator and recipient(s), the current project data file is added to the response message 506.

If there are no matches found, then the processing continues.

Calendar data is queried 504 using the originator's data and the recipient(s)' data. Client data 112 obtains access to users of the system, as well as calendar/event data inside the organization, for example the enterprise environment. This access may be internal to the organization, such as an intranet, or via access to an external server and/or database wherein communication occurs through a network 110. This occurs via interaction with an organization's calendar/event data via access Application Programming Interfaces (APIs), for example.

In one embodiment, the calendar data (such as in a database) may be queried using a database query language, such as Structured Query Language (SQL). For example, calendar/event data may be queried wherein the originator's data and the recipient(s)' data is searched to determine if any of the calendar/event data contain both the originator and recipient(s).

For example, to search calendar/event data, the Java code below using the Google Calendar API shows retrieving events in a user's calendar application:

```
import com.google.api.services.calendar.Calendar;
import com.google.api.services.calendar.model.Event;
// . . .
//Initialize Calendar service with valid OAuth credentials
Calendar service=new Calendar.Builder(httpTransport,
    jsonFactory, credentials)
    .setApplicationName("applicationName").build( );
//Retrieve an event
Event event=service.events( ).get('primary', "eventId")
    .execute( );
```

The event returned is of type "Event", containing the specific details of the event. Including in the Event data is an attendee array:

```
"attendees": [
    {
        "id": string,
        "email": string,
        "displayName": string,
        "organizer": boolean,
        "self": boolean,
        "resource": boolean,
        "optional": boolean,
        "responseStatus": string,
        "comment": string,
        "additionalGuests": integer
    }
```

The attendee array above is part of the data returned in the Event data. The Event data will contain an array with all of the attendees in the event, along with details of each attendee including the email and name.

The Event data also contains the event's creator data including the creator's email and name.

The current application obtains calendar events by utilizing the code above or Google calendar API in the system 106 of the originator and the events of the recipient(s). This is the event(s) that either of them has created. Using the returned Event data, it then determines if any of the events created contain the other user's name or email. If there is a match, this means that the originator and the recipient(s) share an event, and this event data is added to the response 508.

If there are no matches found, then the processing continues.

Documents are searched for the originator and/or the recipient(s) 510. These documents may be located in the user's local file system or may be located remotely in a database wherein queries are routed through a network 110.

For example, the attributes of the documents are obtained via an API. Documents stored in the cloud may be queried wherein the attributes of each of the files are returned:

Once a file is obtained, a call to getEditors( ) returns the users whom have access to edit the file. In the code below, once the file is obtained, a call to getEditors( ) returns the editors of the file.

/ Log the email address of all users who have edit access to a file.
    var file=DriveApp.getFileById ('1234567890abcdefghijklmnopqrstuvwxyz');
    var editors=file.getEditors( );
    for (var i=0; i<editors.length; i++) {
      Logger.log(editors[i].getEmail( ));

The code above stores access to a file via a string that has been determined beforehand. This calculation of the string is not depicted but is determined by the current application obtaining access to the user's file system either locally to the client device, or remotely wherein communication occurs between the client device and a remote database through the network 110.

The method getEditors( ) is called on the obtained file and stored in the variable "editors". This contains all of the details of the users who retain editable access to the file. There exist methods that are available wherein details of each of the editor's information are available:

getDomain( ) Gets the domain name associated with the user's account
    getEmail( ) gets the user's email address
    getName( ) gets the user's name
    getPhotoUrl-gets the URL for the user's photo The emails of each of the editors are obtained by looping through the returned editors wherein a call to getEmail( ) obtains the email address of each of the editors of the file.

The editors of the files are obtained and compared to determine if the originator is an editor of the recipient's files, or the recipient(s) is/are an editor of the originator's files.

In one embodiment, the files within a determined timeframe are searched; therefore not all files are searched, but only those that are recent in time.

In another embodiment, both the files of the originator and the files of the recipient(s)' files are obtained. After the editor(s) of the files are obtained, the editors are searched to determine if either the originator is an editor of the recipient(s)' files and/or the recipient(s) are editors of the originator's files.

If there are one or more files wherein the originator is an editor of the recipient(s)' files or the recipient(s) are editors of the originator's files, the files and/or links to the files are added to the response message 512.

In another embodiment, a maximum number of matching files and/or links to matching files are returned in the response message, for example 5.

If there are no matches found, then the processing continues.

The response message is built using the previously determined data 514 and sent 516.

In another embodiment, other elements may be determined (not depicted) wherein the system 106 may compare data against the incoming query message(s). For example, previous messages may be returned wherein the originator and recipient(s) have previously communicated, other data files such as images, documents, video, etc. files may be returned wherein both the originator and recipient(s) have collaborated or otherwise communicated about, and other types of data without deviating from the scope of the current application.

System Querying for More Information

In one embodiment, the system 106 queries the client device of the originator 108 to determine if more information is desired. This allows the originator to obtain more data that is delivered via the system.

Figure 6:
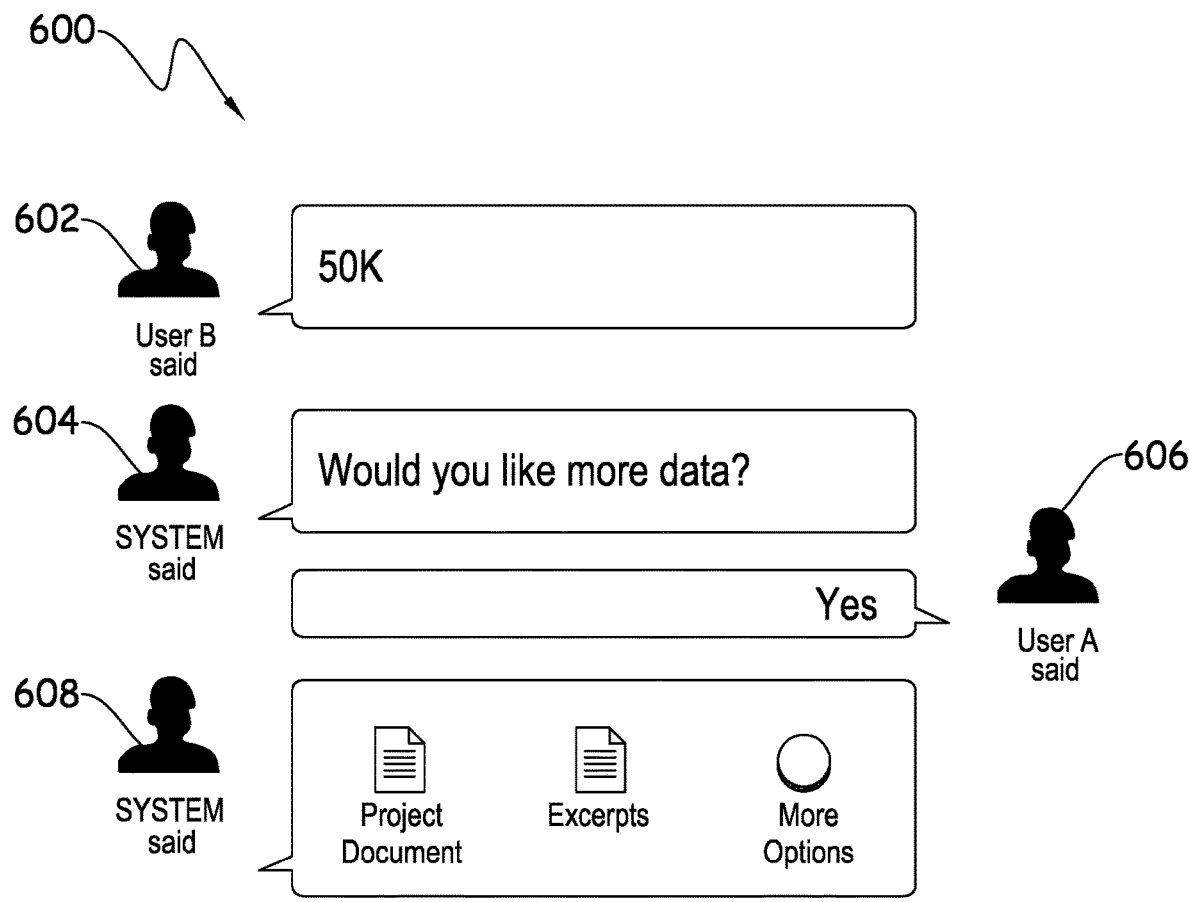
FIG. 6 is a snap shot of a GUI application in one embodiment of the application.

FIG. 6 shows a snapshot of a GUI application in one implementation of the current application wherein the determined documents are integrated into the texting application.

The snapshot 600 is the texting application on the client device of the originator 108 and displays the interaction between the originator 606, the system 604, and the recipient 602.

The originator receives a response from a recipient (User B) with the text "50 k" 602. After a time period, perhaps after a time expires, the system gets involved in the interaction. The system sends the text "Would you like more data?" 604.

The system 604 may send a text message to a user, assuming that the user has allowed a manifest entry similar to the following:

The system may then send a text message in a manner as:
    <uses-permission android:name="android.permission.SEND_SMS"/>
    try {
      //Get the default instance of the SmsManager
      SmsManager smsManager=SmsManager.getDefault( );
      smsManager.sendTextMessage(phoneNumber.getText( ).toString( ),
        null,
        smsBody.getText( ).toString( ),
        null,
        null);
      Toast.makeText(getApplicationContext( ), "Your sms has successfully sent!",
        Toast.LENGTH_LONG).show( );
    } catch (Exception ex) {
      Toast.makeText(getApplicationContext( ), "Your sms has failed . . . ",
        Toast.LENGTH_LONG).show( );
      ex.printStackTrace( );
    }

The code above (Java code for the Android operating system) allows an application, such as the current application executing on the system 604 to send out a text message to a user.

As all interactions between the users pass through the system 106, the involvement of the system into the conversation can be performed, in one implementation of the current application. The system can communicate with any client device of the users of the application.

The originator responds with a "Yes" wherein the client device of the originator 108 sends the message in response 606.

The system processes the response and determines associated data to determine any file(s) or other data related to the current communication, further processing to determine associated data is disclosed herein.

The system responds with additional data pertaining to the interaction 608. The inclusion of files and data is possible via Multimedia Messaging Service (MMS). Current mobile devices support a mixture of both SMS and MMS wherein MMS messages are supported and the MMS protocol may be utilized without alterations to the messaging application.

The data displayed is:
a. A project document
  b. A document entitled "Excerpts"
  c. A "More Options" button.

In another embodiment, a "More Options" button is presented alongside the data wherein a query+message is sent to the system 106 for additional data. The query+ message informs the system that the client in addition to the data already presented seeks data. Upon reception of the query+message, the system performs similar functionality, determining any additional, related data and returns the new data for presentation on the client device.

Figure 7:
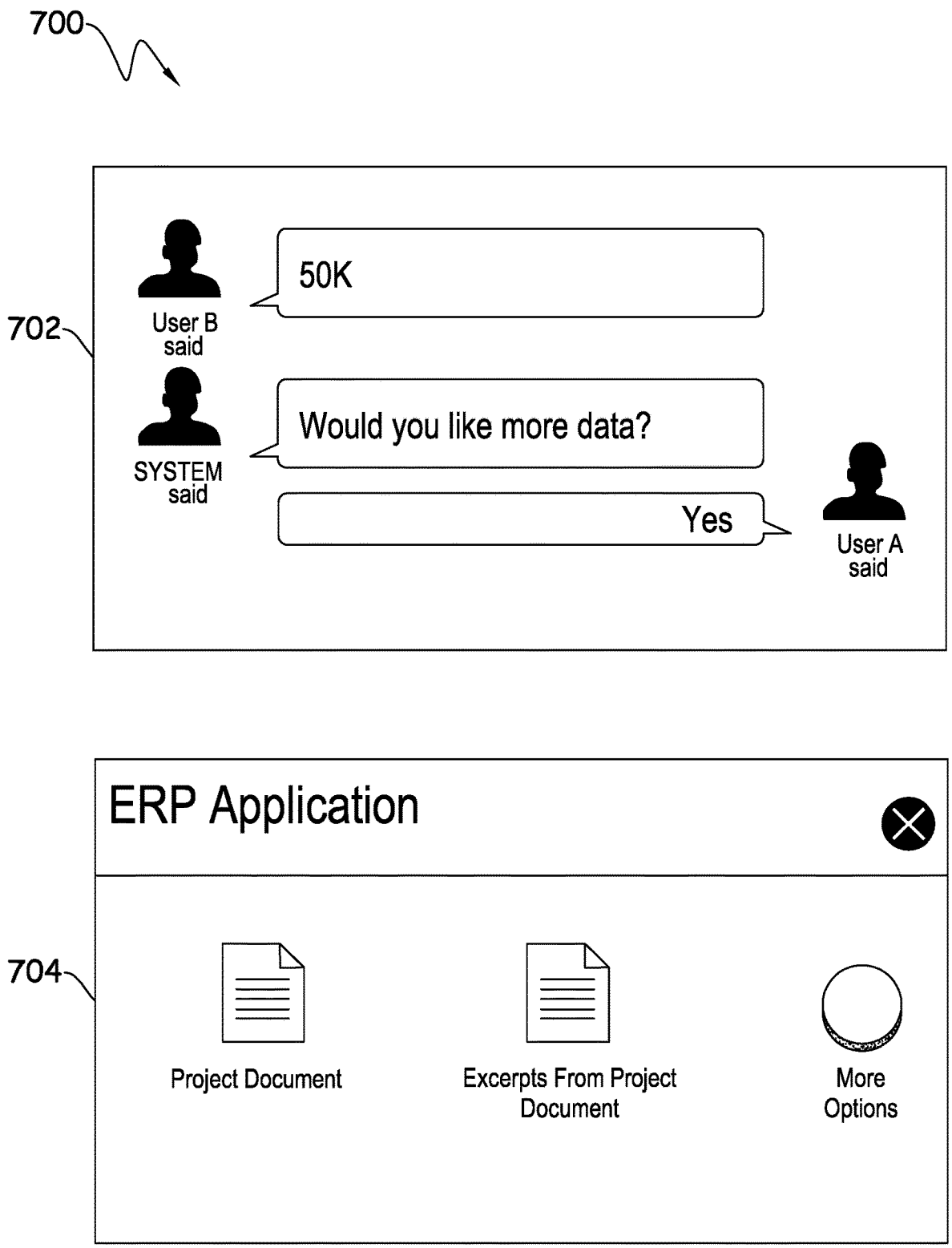
FIG. 7 is a snap shot of the GUI application as pertaining to related documents in one embodiment of the application.

FIG. 7 shows a snapshot of a GUI application in one implementation of the current application wherein the determined documents are shown in an external application 700.

In this embodiment, an external application 704, in this example an ERP Application, is executing in a separate window than the messaging application 702.

Communication between the data obtained via query message(s) are interworked with the external application 704 to deliver the data therein. Interactions between the current application and the ERP application occurs via APIs made available through the ERP application.

In another embodiment, the application displaying the returned data, 704 may be any other application and not a particular type of application (ERP) without deviating from the scope of the current application. For example, the data may be displayed in a popup window, executed via the current application wherein the popup window is displayed outside of the messaging application.

The data is displayed in a similar manner as previously depicted above and interactions with a "More Options" button are also similar.

Interaction with Returned Data

Figure 8:
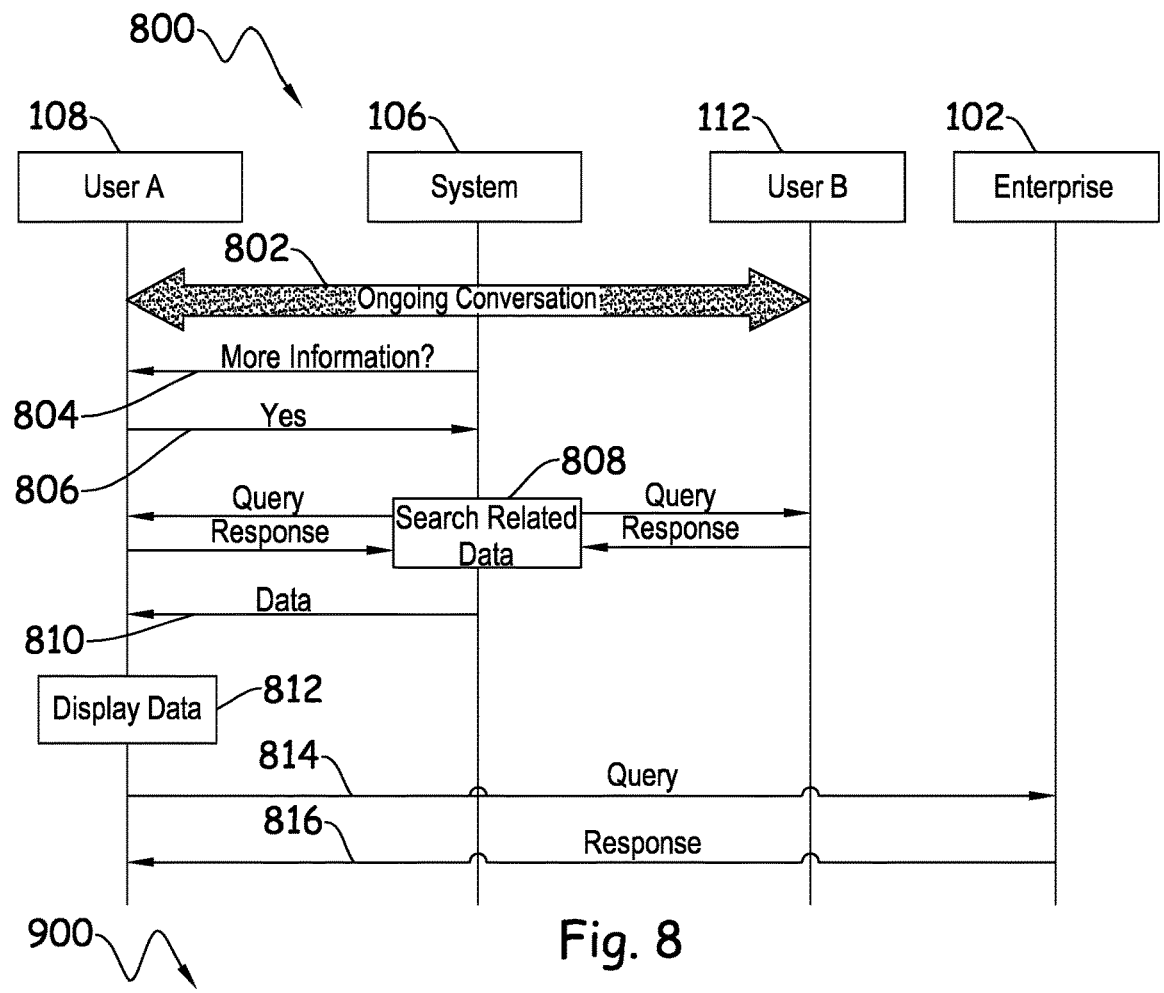
FIG. 8 depicts a message flow illustrating the delivery of data.

In another embodiment, the user interfaces with the returned data from the system 106 on the client device 108 as depicted in 800 in FIG. 8. This may occur through the pointing device wherein the user may "click" on one of the data components on the display. The data is expanded in a separate window.

FIG. 8 is a message flow, which shows the delivery of data and the interaction with the data via the user on a client device 800. Many of the aspects in the flow are depicted herein at a granular level and are not repeated here. The display of data and the interaction with said data is diagnosed here.

In this example, there is a conversation between user A 108 and user B 112, wherein the conversation may be one of emails, test messaging or the like 802. The messages are routed through a system 106 wherein each of the messages is analyzed and key aspects of that message are stored.

The system sends a message "More Information" message 804 to at least one of the users in the conversation 804. This may be after an expired timer where a timer was started in the system 106 and expired, for example. The timer may be utilized to determine if a period of time has occurred wherein one of the users may wish to have additional data related to the current conversation.

The message is received by the client device where a question is presented wherein a positive response or negative response may be obtained.

A positive response is obtained wherein a "Yes" message is sent to the system 806. The reception of a positive response allows the system to begin searching for related data to the conversation 808. The client devices of at least one user in the conversation may be queried for data as indicated via the "query" and "response" messages.

The resultant data is sent to the client device of the user 810. The data may be document(s), file(s), multimedia file(s), event(s), etc. The data is displayed 812 on the client device 108. This may be in the messaging application, or in a separate application.

Interactions with the data elements are allowed in one embodiment wherein a "Query" message 814 is sent to the enterprise system 102, such as a server 106 and/or a database 104 to obtain either the data file or a link to the data file 814. A "Response" message is sent with the requested data 816.

In one embodiment, data is presented based on the priority assigned for each data element such that data that most likely pertains to the conversation is assigned a lower value, and data least likely pertains to the conversation assigned a higher value.

For example, if the title and/or the key element of the document matches at least 3 key elements stored in the analysis of the key elements of the conversation monitored by the system (as described in FIG. 2), the priority assigned is a "1". If the title and/or the key element of the document matches at least 2 key elements stored in the analysis of the key elements of the conversation monitored by the system, the priority assigned is a "2", etc.

As another example, if the name of an event matches at least 3 key elements stored in the analysis of the key elements of the conversation monitored by the system, the priority assigned is a "1", etc.

Figure 9:
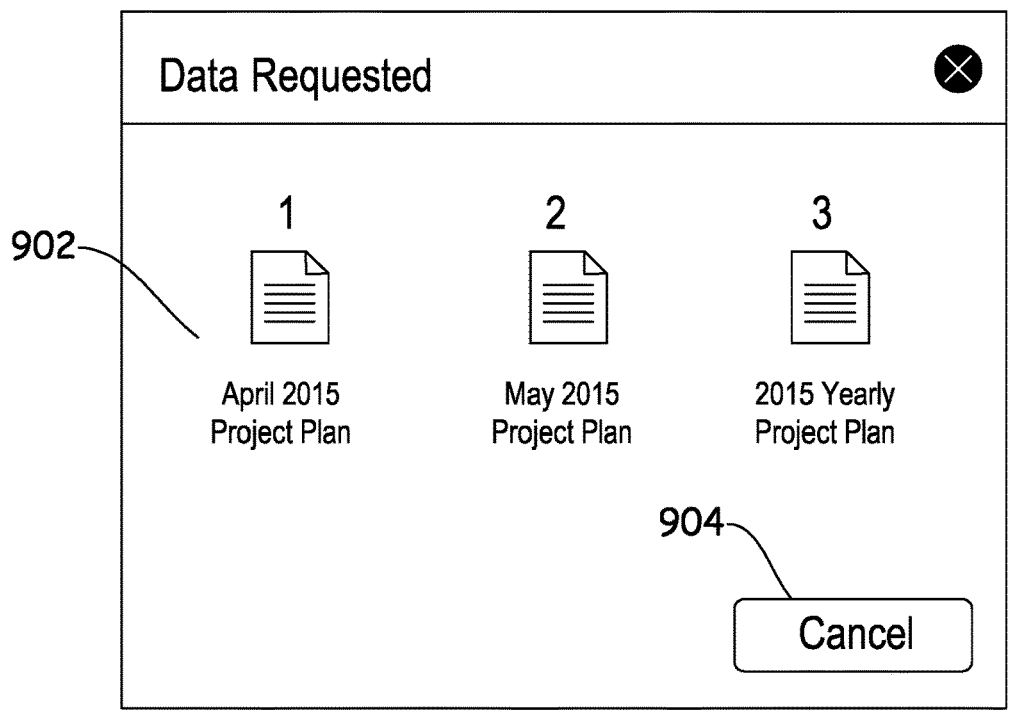
FIG. 9 illustrates an example screen shot displaying related data elements.

FIG. 9 shows an example of data elements displayed in a separate window on the client device 900. There exists a title of the window, "Data Requested" that indicates the purpose of the window.

There are three data elements returned to the client device 108, 902. A number on top of each data elements signifies the priority places on that data element such that a lower number reflects that the data element is most likely a close match to the keys in the conversation, and a higher number reflects that the data element has a greater chance of not directly reflecting a close match to the keys in the conversation.

A "Cancel" button dismisses the window 904.

The user may use a pointing device wherein if the pointing device clicks on one of the data elements 902, the document is pushed to the client device. An event is thrown that is caught by the current application, for example a buttonDown( ) event, wherein a message is sent to obtain the data element from where it is stored. For example, a "Query" message is sent to an enterprise 102 system and either the contents of the file, or a link to the contents of the file is returned in a "response" message (as described in FIG. 8).

The client device 108 then displays the contents of the data element 902 such that the contents of the data is displayed on the client device is a separate, overlaid window such as a popup window (not depicted). When said popup window is closed, the previous window 900 is again displayed wherein the pointing device may click on other elements, or close the window.

In another embodiment, a data element 902 is clicked via a pointing device, and the Uniform Resource Locator (URL)

is returned in a text message to the client device 108, if the messaging application is text message.

In yet another embodiment, the data element clicked on 902 is accessed from the data element's location, and the application executing on the client device 108 asks the question:

Do you wish to store the file in the cloud?"

Yes No

If the pointing device selects "Yes", an event is thrown that is caught such that the application executing on the client device 108 access the remote storage API to store the said data element in the account of the user of the client device 108.

In yet another embodiment of the current application, the application executing on the client device 108 opens a new popup window with the following text:

Do you wish to attach the data to an email?

Yes No

This occurs after the user's pointing device has clicked on a data element 902 and either the data is returned, or a URL pointing to the data element is returned via a query/response message. If "Yes" is selected, the application executing on the client device 108 interworks with an API of the email application normally executed on the client device 108 to attach the said data element to an email message.

Provide Supporting Data

As an additional embodiment, the current application creates supporting data to make the case of what is being sent in a message, and allows the data to be attached to an outgoing message. Logic is added in the current application executing in a device (henceforth referred to as the system), such as a client device 108 such that the system obtains a logical understanding of what is being typed on the client device, such as what is being typed in composing a message, for example.

Processing is initiated via the current application executing on the client device 108 in an attempt to validate what is being typed using data available on the device, such as the files located on the device, or files located remotely on a server 106 and/or a database 104.

Data, such as files, are displayed on the client device via the current application executing on the client device 108 wherein the data may be provided as an attachment to the message, for example an email.

Figure 10:
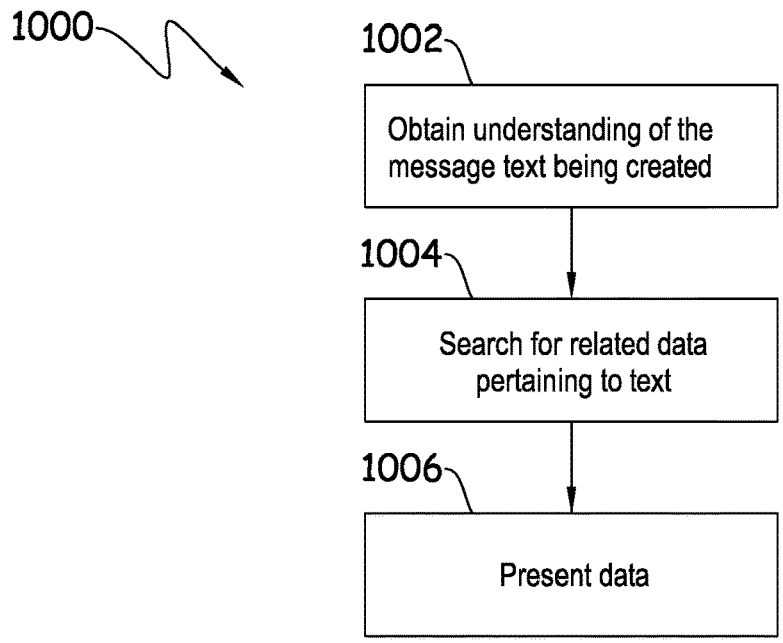
FIG. 10 illustrates a flow chart of obtaining related data pertaining to entered text.

FIG. 10 is a flowchart depicting the overall flow of logic wherein the current application seeks to find data pertaining to what is bring input into the device 1000.

As text is entered into an application on the client device 108, the current application obtains the text 1002 and seeks to determine related data, such as files, pertaining to the text 1004.

This data is presented 1006 via GUI components on the client device 108 such that the related data may provide additional validity to the text being entered or allow the text to be altered based on the displayed, related data presented.

Each of the steps above are depicted below, providing the details of the logic and flow of how each of the functionalities are performed.

Obtaining an Understanding of Message Text

The current application executing on the client device 108 provides real-time analysis of what is being input in the application, such as an email application for example. As text is input into the client device, the current application obtains said text and performs analysis on the text to gain a high-level understanding of the concept of the text.

As text is input into the application, more specifically as text is entered into the main portion of the message, the text is captured by the current application wherein it is parsed for topics. For example, when an email is composed, the main text is in the "body" text component. By gaining access to the event thrown when the body of the message is exited (such as when the "body" text component loses focus such as when the next GUI component gains focus), it is possible to capture the text entered into the "body" text component and analyze it with the current application.

In one embodiment, an event is thrown upon particular interactions of the GUI of the application executing on the client device 108. For example, when the user tabs off of the "Body:" field, an event is thrown that is caught by the current application.

In Java, for example, to handle a focus event in the GUI of the client device 108, a class must implement the FocusListener interface. The code below shows the creation of a textfield, and assigns a focus event for it.

```
private void toFieldComponent( ){
    JTextField toField=new JTextField( );
    toField.addFocusListener(new   CustomFocusListener
        ( ));
    controlPanel.add(toField);
    mainFrame.setVisible(true);
}
class CustomFocusListener implements FocusListener{
    public void focusGained(FocusEvent e) {
        statusLabel.setText(statusLabel.getText( )
        +e.getComponent( ).getClass( ).getSimpleName
            ( )+"gained focus.");
    }
    public void focusLost(FocusEvent e) {
        statusLabel.setText(statusLabel.getText( )
        +e.getComponent( ).getClass( ).getSimpleName
            ( )+"lost focus.");
        sendMessage(originator, recipients[ ]);
}
```

In one embodiment, an event is thrown upon particular interactions of the GUI of the application executing on the client device 108. For example, when the user tabs off of the "Body:" field, an event is thrown that is caught by the current application.

The method toFieldComponent( ) creates a JTextField element (toField) then adds a focus listener by calling addFocusListener to the component. The addFocusListener method creates a new CustomFocusListener( ) which is defined below the messageFieldComponent( ) method.

Two focus listeners are implemented in the CustomFocusListener class: a focusGained( ) and a focusLost( ).

In execution, the code of the focusGained( ) implementation will be executed when focus is gained on the textField as the CustomFocusListener( ) method has been added to the components. Also, the focusLost( ) implementation will be executed when focus is lost on the textField.

Therefore, as the focus is lost on the GUI of the display on the client device 108 on the toField component, the focusLost method is automatically executed where a message is sent out containing the originator and recipient array.

This logic is utilized to analyze the text entered into the "Body:" text component of the composing message on the client device 108.

In another embodiment, there are other ways to initiate analyzing of the message body text. For example, the programming of the current application executing on the client device 108 may trigger the event thrown when the Tab key is used to traverse through different fields in the GUI, and when the current textfield's focus is moved via the use of the Tab key, the event is thrown and caught to analyze the body text of the message.

The current application executing on a device, such as the client device 108 utilizes software to analyze the text. For example, the tool Natural Language Toolkit (NLTK) is utilized to perform analysis on an original message 412. NLTK provides a pool of language processing tools written in the Python language, including data mining, machine learning, data scraping, sentiment analysis and other various language processing tasks, as further disclosed herein.

The text of the body input in the "Body:" of the composing message is split into sentences using sentence segmentation, then tokenized wherein the sentences are split into words. Finally, through the use of relation detection, relations between different entities in the text are determined.

The use of the NLTK software is one example of the natural language tools available for use in the current application and is depicted herein as an example only. One versed in software development techniques may easily utilize other algorithms wherein the concepts of the "Body:" of the message may be determined without deviating from the scope of the current applications.

For example, the "Body:" of the message input is:
Hello Bob,
I wanted to talk to you about the headcount change for next year. I predict that we will need an increased headcount of 4. Based on the projections of the meeting last week, the new customer may provide additional features that will justify the additional people. Let's have lunch soon and discuss.

In the analysis of the text, the following text is one of the key sentences derived:
I predict that we will need an additional headcount of 4.

Locating Related Data

The current application executing on the client device 108 obtains the key elements of the text of the message body, for example the "Body:" text of the composing message.

Data related to the text is sought on files data local to the client device 108, and remote to the client device, such as data stored in the "cloud" or network 110. The current application accesses the local data via interactions with application data, such as through an Application Program Interface (API) of the applications.

For example, the current application may search message applications (such as email and text applications) wherein a search string is used to search through previously sent messages. Using the Google Gmail API for example, searching or filtering files using the messages.list and threads.list methods is possible. These methods accept the q parameter, which supports the same advanced search syntax as the Gmail web-interface, meaning messages may be filtered using search queries to filter messages by properties such as the sender, date, or label to name a few possibilities.

Furthermore, additional search functionality may be used to search through messages. Placing parenthesis in the search term groups the search terms together, chat message may be searched by the string "Is:chat", messages sent to a specific email address is performed by adding the string "Deliveredto", as well as others.

Continuing the example, the terms "increase" and "headcount" are searched in the data on the client device 108. The following text is obtained:

I recommend that an increase in headcount of 7 is necessary.
I believe an increase of 8 headcount would suffice.

Figure 11:
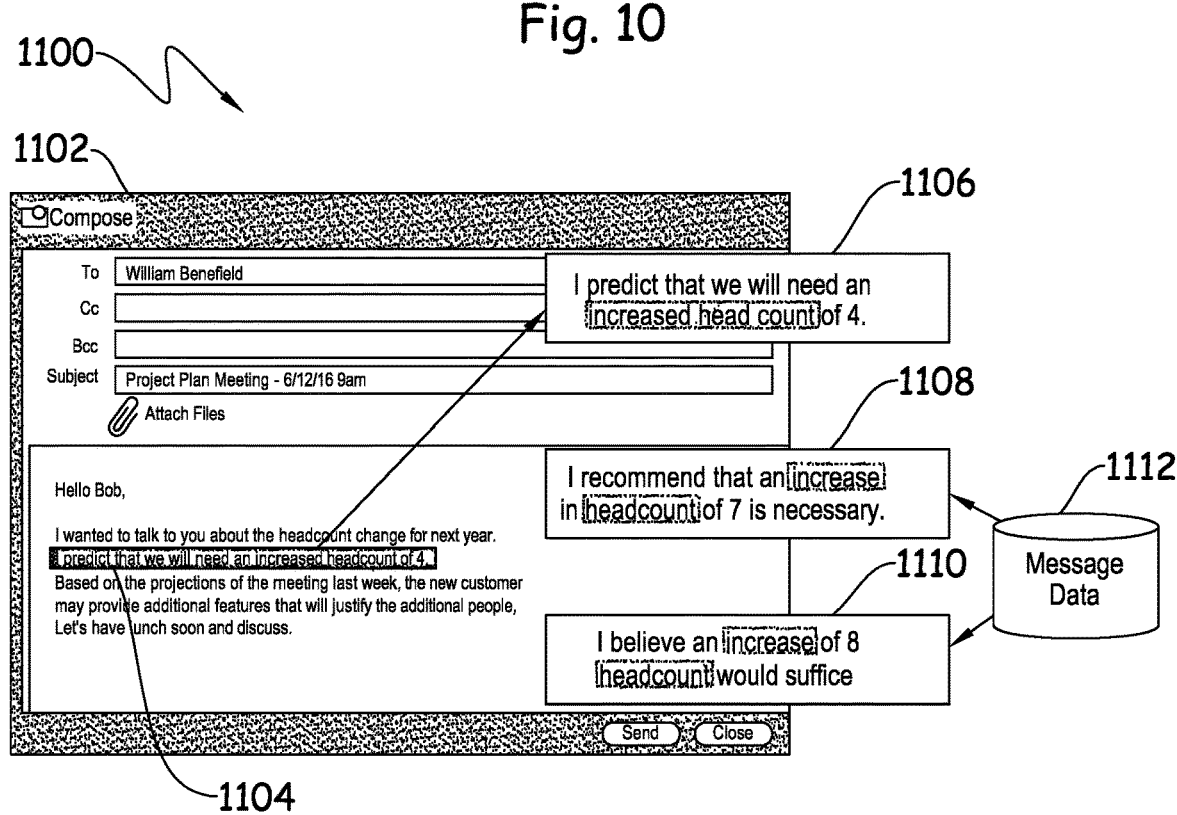
FIG. 11 depicts an example scenario depicting a screen shot of collection of data from a composing message.

FIG. 11 displays the collection of data from a composing message and the related data from message data of the client device 108, 1100.

A message is composed 1102 via a messaging application executing on the client device 108. The text in the "Body:" of the message is parsed wherein the highlighted sentence 1104 is determined to be one of the key sentences, as further disclosed herein. This text 1106 is used to search the data pertaining to the user of the client device 108.

Message data 1112 is searched wherein the message data may be located locally on the client device 108, or may reside remotely on a database such as database 104, server 106, or in the "cloud" or network 110 which may be stored in a database or server connected to the network 110.

In searching the local and/or remote data, two items are discovered 1108 and 1110. These are previous emails associated with the user of the client device 108.

The highlighted words in the data 1106, 1108, and 1110 reflect the matching words used in the query and the results.

In another embodiment, calendar events, files located locally on the client device 108 or remotely, and other types of data such as audio, video, and other types of media files may be searched and returned in the processing of searching the user-data.

Display Related Data

The obtained data in the previous step is now presented on the GUI of the client device 108 such that the data may highlight previously agreed to increase in headcount, for example. This data may help question or validate the text currently entered into the composing message.

Figure 12:
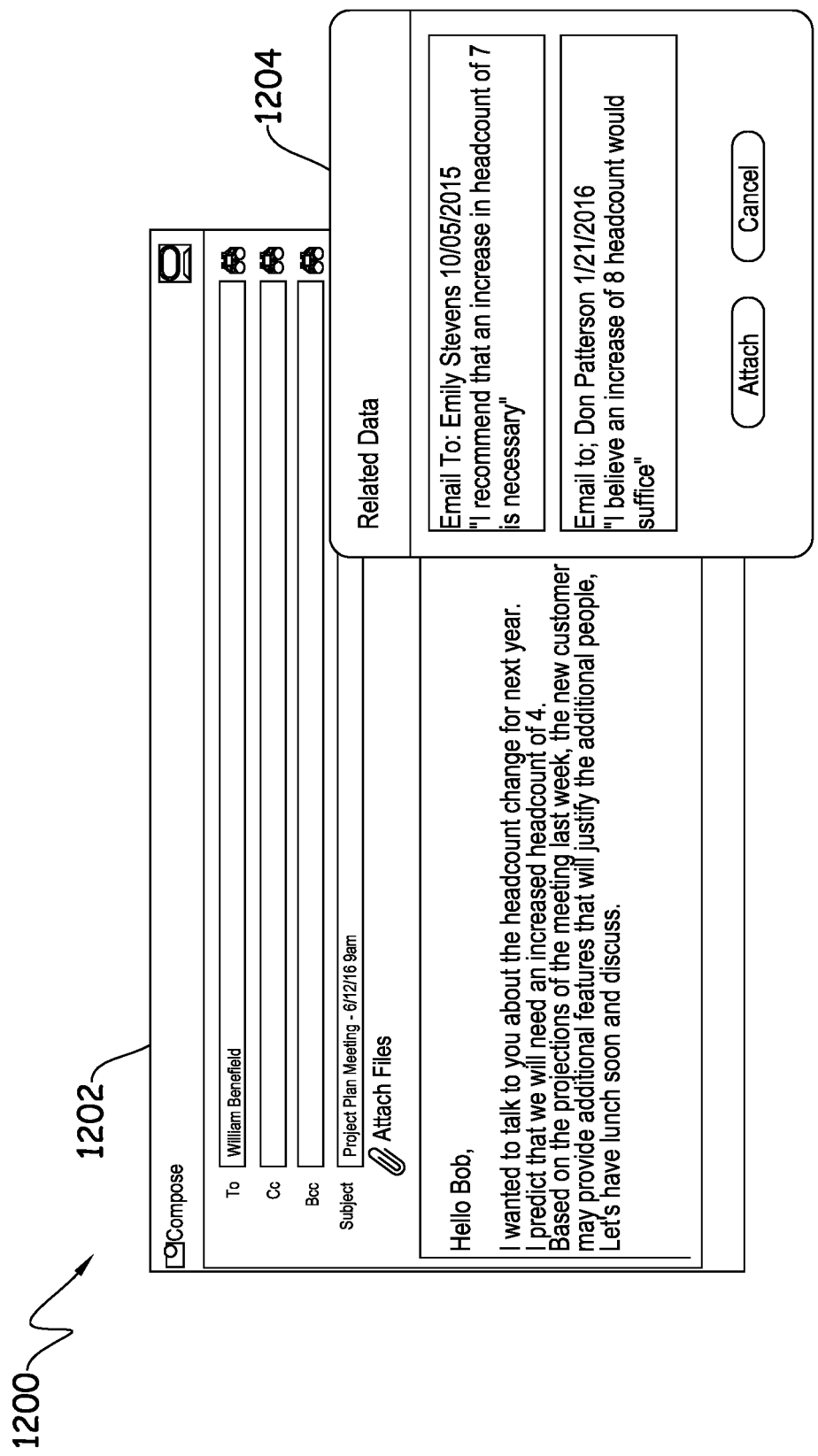
FIG. 12 depicts an example scenario of a GUI screen shot of related data that pertains to the composed message.

FIG. 12 is a GUI representation of the display of data that is encountered 1200. The composing message 1202 shows the message being composed on the client device 108.

A popup window 1204 is presented on the display of the client device 108. The popup window displays the data such that the elements are separated. Each element is titled showing the type of data encountered. Two elements encountered are emails. The details of the email are listed with the recipient and the date of the email. Also included is the text that in the email that was a match to the queried data.

Finally, there are two buttons on the bottom of the popup window 1204. An "Attach" button attaches the elements to the composing message 1202 wherein the data in the elements on the popup window 1204 are added as attachments to the composing message.

In another embodiment, the data in the elements listed in the popup window 1204 are added to the text of the "Body:" of the composing message 1202, at the end of the body text via an "Add To Message" button (not depicted).

In another embodiment, the text that was utilized in the query of data in the composing message 1202 is highlighted in the GUI.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A method, the comprising:
    intercepting, by a network system, a communication transmitted between an originator device and a recipient device;
    identifying, by the network system, content of the communication;
    activating, by the network system, a timer monitoring a predetermined time period for the recipient device to respond to the communication;
    sending, by the network system, and based on an expiration of the timer, a message to the recipient device offering additional information, not transmitted in the communication, but related to the content;
    based on a response from the recipient device, sending, by the network system, a query message to the recipient device and the originator device requesting the additional information related to the content; and
    sending, by the network system, the additional information received from the recipient device and the originator device to the recipient device for display.

2. The method of claim 1, wherein the identifying the content further comprises:
    extracting keywords and phrases from the communication.

3. The method of claim 1, further comprising:
    searching one or more external data sources to locate the additional information.

4. The method of claim 1, further comprising:
    identifying the additional information related based on keywords and phrases of the content.

5. The method of claim 1, wherein the additional information includes at least one of:
    documents stored in both the originator device and the recipient device, and associated with the content; and
    event data stored in both the originator device and the recipient device, and associated with the content.

6. The method of claim 5, wherein the event data includes calendar data related to both the originator device and the recipient device.

7. The method of claim 1, wherein the sending the additional information for display further comprises:
    sending the additional information for display via a pop-up window with a button providing an option to transmit the additional information as an attachment to a reply message.

8. The method of claim 7, further comprising:
    receiving, by the network system, a request for an additional search for related data based on a user selection of a button displayed via the pop-up window.

9. The method of claim 1, further comprising assigning a priority to each of a plurality of related data elements in the additional information by:
    comparing at least three keywords from the communication to keywords in each related data element determined by the system;
    assigning the highest priority number to a related data element with a greatest number of matching keywords to the communication;
    assigning a lowest priority number to a related data element with a lowest number of least matching keywords to the communication; and
    presenting the prioritized data elements in a pop-up window on at least one of the originator device and the recipient device.

10. The method of claim 9, wherein the each related data element is one of a relevant document or relevant event data.

11. The method of claim 1, wherein the identifying the content of the communication further comprises:
    analyzing text in real-time as the text is typed in the communication.

12. A system, comprising:
    a processor of a network system; and
    a memory configured to store instruction that cause the processor to:
    intercept a communication transmitted between an originator device and a recipient device,
    identify content of the communication,
    activate a timer monitoring a predetermined time period for the recipient device to respond to the communication,
    send, based on an expiration of the timer, a message to the recipient device offering additional information, not transmitted in the communication, but related to the content,
    based on a response from the recipient device, send a query message to the recipient device and the originator device requesting the additional information related to the content, and
    send the additional information received from the recipient device and the originator device to the recipient device for display.

13. The system of claim 12, wherein, when the processor is to identify the content, the processor is further configured to:
    extract keywords and phrases from the content of the communication.

14. The system of claim 12, wherein the processor is further configured to:
    identify the additional information from keywords and phrases in the content of the communication.

15. The system of claim 12, wherein the additional information is at least one of:
    documents stored in both the originator device and the recipient device, and associated with the content; and
    event data stored in both the originator device and the recipient device, and associated with the content.

16. The system of claim 15, wherein the event data includes calendar data related to both the originator device and the recipient device.

17. The system of claim 12, wherein the processor is further configured to:
    compare at least three keywords from the communication to keywords of each related data element determined by the system;
    assign a highest priority number to a related element with a greatest number of matching keywords to the communication;
    assign a lowest priority number to a related element with a least number of matching keywords to the communication; and
    present the prioritized elements in a pop-up window on at least one of the at least one originator device and the recipient device.

18. A non-transitory computer readable medium storing that when executed by a processor cause the processor to perform:
    intercepting a communication transmitted between an originator device and a recipient device;
    identifying content of the communication;
    activating a timer monitoring a predetermined time period for the recipient device to respond to the communication;

sending, based on an expiration of the timer, a message to the recipient device offering additional information, not transmitted in the communication, but related to the content;

based on a response from the recipient device, sending a query message to the recipient device and the originator device requesting the additional information related to the content; and sending the additional information received from the recipient device and the originator device to the recipient device for display.

\* \* \* \* \*